United States Patent
Chen et al.

(10) Patent No.: US 11,078,358 B2
(45) Date of Patent: Aug. 3, 2021

(54) CURABLE COMPOSITION INCLUDING EPOXY RESIN AND CURABLE SOLID FILLER

(71) Applicant: 3M INNOVATIVE PROPERTIES COMPANY, St. Paul, MN (US)

(72) Inventors: Lianzhou Chen, Woodbury, MN (US); Kristen J. Hansen, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/494,976

(22) PCT Filed: Jul. 25, 2018

(86) PCT No.: PCT/US2018/043597
§ 371 (c)(1),
(2) Date: Sep. 17, 2019

(87) PCT Pub. No.: WO2019/027746
PCT Pub. Date: Feb. 7, 2019

(65) Prior Publication Data
US 2020/0148878 A1 May 14, 2020

Related U.S. Application Data

(60) Provisional application No. 62/539,321, filed on Jul. 31, 2017.

(51) Int. Cl.
| | |
|---|---|
| *C08L 63/00* | (2006.01) |
| *C08G 59/24* | (2006.01) |
| *C08G 59/32* | (2006.01) |
| *C08G 59/38* | (2006.01) |
| *C08G 59/44* | (2006.01) |
| *C08K 5/00* | (2006.01) |
| *C08K 5/17* | (2006.01) |
| *C08K 7/02* | (2006.01) |

(52) U.S. Cl.
CPC ............ *C08L 63/00* (2013.01); *C08G 59/245* (2013.01); *C08G 59/3227* (2013.01); *C08G 59/38* (2013.01); *C08G 59/44* (2013.01); *C08K 5/0025* (2013.01); *C08K 5/17* (2013.01); *C08K 7/02* (2013.01); *C08K 2201/005* (2013.01); *C08K 2201/011* (2013.01)

(58) Field of Classification Search
CPC ... C08L 63/00; C08G 59/245; C08G 59/3227; C08G 59/38; C08G 59/44
USPC .......................................................... 523/427
See application file for complete search history.

(56) References Cited

U.S. PATENT DOCUMENTS

| | | |
|---|---|---|
| 4,500,703 A | 2/1985 | Guthrie |
| 5,728,755 A | 3/1998 | Weigel |
| 8,088,245 B2 * | 1/2012 | Lutz .................. C08G 59/4253 156/325 |
| 8,268,926 B2 | 9/2012 | Bonneau |
| 8,313,830 B2 | 11/2012 | Bonneau |
| 2011/0278053 A1 | 11/2011 | Hayashi |

FOREIGN PATENT DOCUMENTS

| | | | |
|---|---|---|---|
| EP | 1632533 A1 * | 3/2006 | .............. C08L 63/00 |
| EP | 2014721 | 1/2009 | |
| WO | WO 2007-003650 | 1/2007 | |
| WO | WO 2014-202593 | 12/2014 | |
| WO | WO 2016-014284 | 1/2016 | |

OTHER PUBLICATIONS

International Search Report for PCT International Application No. PCT/US2018/043597, dated Dec. 6, 2018, 7 pages.

* cited by examiner

*Primary Examiner* — David T Karst
(74) *Attorney, Agent, or Firm* — Philip P. Soo

(57) ABSTRACT

The present disclosure provides a curable composition. The curable composition includes a liquid epoxy resin component a curative component, and a curable resin filler component. At least a portion of curable resin filler is dispersed in the liquid epoxy resin and solid at about 25° C. According to various examples, the curable composition can produce a film having good tackiness and improved handling characteristics. Additionally, according to some examples, a cured product of the curable composition can have a Wet Glass Transition Temperature and a Dry Glass Transition Temperature that are substantially the same.

21 Claims, No Drawings

CURABLE COMPOSITION INCLUDING EPOXY RESIN AND CURABLE SOLID FILLER

CROSS REFERENCE TO RELATED APPLICATIONS

This application is a national stage filing under 35 U.S.C. 371 of PCT/US2018/043597, filed Jul. 25, 2018, which claims the benefit of U.S. Provisional Patent Application No. 62/539,321, filed Jul. 31, 2017, the disclosures of which are incorporated by reference in their entirety herein.

BACKGROUND

Curable compositions and cured products formed from the compositions find use in many applications. However, current curable compositions and cured products formed therefrom suffer from various shortcomings, such as brittleness and lack of uniform behavior across various temperature conditions or environmental conditions.

SUMMARY OF THE DISCLOSURE

The present disclosure provides a curable composition. The curable composition includes a liquid epoxy resin component, a curative component, and a curable resin filler component. At least a portion of curable resin filler is dispersed in the liquid epoxy resin and solid at a temperature of about 25° C.

The present disclosure further provides a method of making a curable composition. The curable composition includes a liquid epoxy resin component, a curative component, and a curable resin filler component. At least a portion of curable resin filler is dispersed in the liquid epoxy resin and solid at about 25° C. The method includes adding the curative component to a first solution comprising the liquid epoxy resin component and the curable resin filler component to form a second solution. The method further includes the step of forming the curable composition.

The present disclosure further provides a method of curing a curable composition. The curable composition includes a liquid epoxy resin component, a curative component, and a curable resin filler component. At least a portion of the curable resin filler is dispersed in the liquid epoxy resin and solid at about 25° C. The method includes increasing the temperature of the environment to a curing temperature. Curing the curable composition may also include changing pressure in an environment surrounding the curable composition to a curing pressure that is higher or lower than ambient pressure.

The present disclosure further provides a method of using a curable composition. The curable composition includes a liquid epoxy resin component, a curative component, and a curable resin filler component. At least a portion of curable resin filler is dispersed in the liquid epoxy resin and solid at about 25° C. The method of using the curable composition includes the steps of contacting the curable composition with a first substrate. The method further includes curing the curable composition.

Various embodiments of the present disclosure provide various advantages, some of which are unexpected. For example, according to some embodiments, a curable film having good tackiness and improved handling characteristics (e.g., substantially not brittle) can be achieved by adding a solid curable resin filler to a liquid epoxy resin and adding a large amount of thermoplastic resin to the liquid epoxy resin. According to some embodiments, adding a solid curative resin filler to a liquid epoxy resin and adding large amount of thermoplastic resin to the liquid epoxy resin can allow for a higher loading of the solid curative resin in the curable composition, which can increase the thermal performance of the curable composition and the resulting cured product. For example, according to some embodiments, a Wet Glass Transition Temperature and a Dry Glass Transition Temperature of the cured product is substantially the same. This can allow the cured product to retain its form and adhesion across a wide spectrum of temperatures and environmental conditions.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "substituted" as used herein in conjunction with a molecule refers to the state in which one or more hydrogen atoms contained therein are replaced by one or more non-hydrogen atoms. The term "functional group" or "substituent" as used herein refers to a group that can be or is substituted onto a molecule. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{20}$)hydrocarbyl, alkyl, acyl, cycloalkyl, aryl, aralkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 20 carbon atoms, or 2 to about 15 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "weight-average molecular weight" as used herein refers to Mw, which is equal to $\Sigma M_i^2 n_i/\Sigma M_i n_i$, where $n_i$ is the number of molecules of molecular weight M. In various examples, the weight-average molecular weight can be determined using light scattering, small angle neutron scattering, X-ray scattering, and sedimentation velocity.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

Curable Composition

A curable composition can include various components. Non-limiting examples of various components that can be present in the curable composition include a liquid epoxy resin component. The liquid epoxy resin component is a monofunctional epoxy resin or multifunctional epoxy resin that is a liquid at room temperature. The curable composition can further include a curable resin filler component. At least a portion of the curable resin filler component is dispersed in the liquid epoxy resin and solid at about 25° C. The curable composition further includes a curative component. The curative component is a component that can be activated by heat or light to cure the liquid epoxy resin component. The curable composition can include additional components as well.

The curable resin filler component generally acts as a filler when the curable composition is in an uncured state. As a solid in the uncured state, the curable resin filler can help to give the curable composition dimensional stability, which allows the composition to be more easily applied on a substrate while retaining its shape and/or structure. Furthermore, by not immediately, or by only partially dissolving, the curable resin filler, the curable composition can form a substantially non-brittle curable film.

Liquid Epoxy Resin Component

The liquid epoxy resin component can be in a range of from about 20 wt % to about 90 wt % of the curable composition, about 25 wt % to about 70 wt %, or less than, equal to, or greater than about 20 wt %, 25, 30, 35, 40, 45, 50, 55, 60, 65, 70, 75, 80, 85, or about 95 wt % of the curable composition. The exact wt % of the liquid epoxy resin component can be specifically chosen in order to affect the handling of the uncured film. (e.g., the ability to cut the film and apply the film to a substrate). Moreover, the wt % of the liquid epoxy resin component can affect the properties of the curable composition or a cured product of the composition. As an example, if the curable composition includes a higher wt % of liquid epoxy resin, the uncured film might be non-tacky or tacky, a final cured product may be stronger or less malleable under certain circumstances. The wt % of the liquid epoxy resin can also be selected to better match the stoichiometry with the liquid epoxy resin and other components such as the curable resin filler component or curative component so as to not have an excess or too little of any component.

The liquid epoxy resin component can include one or more epoxy resins. The epoxy resins can be the same epoxy resin or can be different epoxy resins. As generally understood, epoxy resins are low molecular weight pre-polymers or higher molecular weight polymers, which can include at least two epoxide groups. In some examples, epoxide groups are also referred to as a glycidyl or oxirane group. Epoxy resins can be polymeric or semi-polymeric materials, and as such variable chain lengths can result from the polymerization reactions used to produce them.

The epoxy resins are chosen from epoxy resins that are a liquid at room temperature (e.g., 20° C.) and standard pressure (101 kPa). Suitable classes of epoxy resins include monofunctional epoxy resins and multifunctional epoxy resins. Suitable examples of epoxy resins can include one or more epoxy resins that are chosen from a diglycidyl ether of bisphenol F, a low epoxy equivalent weight diglycidyl ether of bisphenol A, a liquid epoxy novolac, a liquid aliphatic epoxy, a liquid cycloaliphatic epoxy, a 1,4-cyclohexandimethanoldiglycidylether, 3,4-epoxycyclohexylmethyl-3,4-epoxycyclohexane carboxylate, tetraglycidylmethylenedianiline, N,N,N',N'-Tetraglycidyl-4,4'-methylenebisbenzenamine a triglycidyl of para-aminophenol, N,N,N',N'-tetraglycidyl-m-xylenediamine or a mixture thereof. The liquid epoxy resins can be homogenously dispersed in the liquid epoxy resin component, which can be at least in part due to the liquid epoxy resins being liquid at room temperature. In some examples the liquid epoxy can be a mixture of any of the liquid epoxies described herein with a solid epoxy capable of being dissolved, or pre-dissolved, and capable of being a liquid epoxy at about 25° C. In some examples, the solid epoxy can be heated to a temperature ranging from about 50° C. to about 150° C. to make it quicker to dissolve the solid epoxy. After the heating the solution is allowed to cool to a lower temperature such as 25° C.

Curable Resin Filler

The curable resin filler component can be in a range of from about 2 wt % to about 70 wt % of the curable composition, about 10 wt % to about 25 wt % of the curable composition, or less than, equal to, or greater than about 2 wt %, 5, 10, 15, 20, 25, 30, 35, 40, 45, 50, 55, 60, 65, or about 70 wt % of the curable composition. The exact wt % of the curable resin filler component can be specifically chosen in order to affect the properties of the curable composition or a cured product of the composition. As an example, if the curable composition includes a higher wt % of curable resin filler, a final cured product may be stronger (e.g., tougher) or less malleable under certain circumstances. The wt % of the curable resin filler component can also be selected to better match the stoichiometry with the liquid epoxy resin and other components such as the curative component.

The wt % of the curable resin filler component can be higher than in other curable compositions, such as a curable composition where a curable resin and/or a thermoplastic filler polymer are immediately dissolved in a liquid epoxy resin. This is because the curable resin filler component remains a solid when dispersed in the liquid epoxy resin at room temperature, which allows the uncured film to still maintain the handling properties. Indeed the inventors have found that if the curable resin filler is fully dissolved or a majority of the curable resin filler is dissolved (or a significant amount of the curable resin filler is dissolved in the liquid epoxy resin), then the resulting curable film will be brittle or cannot easily applied during application.

Although the curable resin filler is generally in a solid state (e.g., not a liquid) in the curable composition, it is possible for some amount of the curable resin filler to dissolve within the liquid epoxy resin and thus no longer in the solid state. The portion of the curable resin filler component that is solid in the curable composition can be in the range of from about 5 wt % to about 100 wt % of the curable resin filler component, about 80 wt % to about 95 wt %, or less than, equal to, or greater than about 5 wt %, 10, 15, 20, 25, 30, 35, 40, 45, 50, 55, 60, 65, 70, 75, 80, 85, 90, 95, or about 100 wt % of the curable resin filler component.

The curable resin filler component can include one or more resins. The one or more resins can be the same resin or different resins. The one or more resins can have a melting point ranging from about 50° C. to about 250° C., about 100° C. to about 200° C., or less than, equal to, or greater than about 50° C., 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or about 250° C. The one or more resins can be chosen from a solid epoxy resin, a bismaleimide resin, a polyimide resin, a cyanate ester resin, a benzoxazine resin, and mixtures thereof.

The bismaleimide resin can be chosen from N,N'-(ethylene)-bismaleimide, N,N'-(hexamethylene)-bismaleimide, N,N'-(dodecamethylene)-bismaleimide, N,N'-(2,2,4 trimethyl-hexamethylene)-bismaleimide, N,N'-(oxydipropylene)-bismaleimide, N,N'-(amino-di-propylene) bismaleimide, N,N'-(1,3-cyclohexylene)-bismaleimide, N,N'-(1,4-cyclo-hexylene)-bismaleimide, N,N'-(methylene-1,4-dicyclohexylene)-bismaleimide, N,N'-(3,3'-dimethyl-4,4'-biphenylene)-bismaleimide, N,N'-(m-phenylene)-bismaleimide, N,N'-(p-phenylene)-bismaleimide, N,N'-(o-phenylene)-bismaleimide, N,N'-(1,3-naphthylene)-bismaleimide, N,N'-(1,4-naphthylene)-bismaleimide, N,N'-(1,5-naphthylene)-bismaleimide, N,N'-(4,6-dimethyl-1,3-phenylene)-bismaleimide, N,N'-(2,4-toluylene) bismaleimide, N,N'-(2,6-toluylene)-bismaleimide, N,N'-(methylene-di-p-phenylene)-bismaleimide, N,N'-(oxydipropylene)-bismaleimide, N,N'-(oxy-di-p-phenylene)bismaleimides, N,N'-(4, 4'-diphenylmethane) bismaleimides, N,N'-(4,4'-diphenylether)-bismaleimide, N,N'-(4,4'-diphenylsulfone)-bismaleimide and N,N'-(4,4' diphenyldithio)-bismaleimide, N,N'-(m-phenylene)-bismaleimide, N,N'-(4,4'-diphenylmethane)-bismaleimide, and a mixture thereof.

Examples of cyanate esters can include 1,3-dicyanatobenzene; 1,4-dicyanatobenzene; 1,3,5 tricyanatobenzene; 1,3-, 1,4-, 1,6-, 1,8-, 2,6- or 2,7-dicyanatonaphthalene; 1,3,6-tricyanatonaphthalene; 4,4'-dicyanato-biphenyl; bis(4-cyanatophenyl)methane and 3,3 ',5,5'-tetramethyl bis(4-cyanatophenyl)methane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)sulfide; 2,2-bis(4-cyanatophenyl)propane; tris(4-cyanatophenyl)-phosphite; tris(4-cyanatophenyl) phosphate; bis(3-chloro-4-cyanatophenyl)methane; cyanated novolac; 1,3-bis[4-cyanatophenyl-1-(methylethylidene)]benzene and cyanated bisphenol-terminated polycarbonate or other thermoplastic oligomer.

Examples of classes of polyimide polymers include polyamide-imide polymers and polyetherimide polymers. Suitable polyetherimide polymers include those that are melt processable. Polyimide resins that are polyetherimides or copolymers comprising both polyimide and polyetherimide structural units are also suitable.

Examples of benzoxazine resins include 3-chloroisatoic anhydride, 4-chloroisatoic anhydride, 5-chloroisatoic anhydride, 6-chloro-3-oxo-3,4-dihydro-2H-1,4-benzoxazine-7-sulfonyl chloride, 2H-1,3-benzoxazine-2,4(3H)-dione, 6-bromo-2H-1,4-benzoxazin-3 (4H)-one, 6-chloro-2H-1,4-benzoxazin-3 (4H)-one, 6-fluoro-2H-1,4-benzoxazin-3 (4H)-one, 6-nitro-2H-1,4-benzoxazin-3 (4H)-one, 2H-1,4-benzoxazin-3 (4H)-one, 6-chloro-3,4-dihydro-2H-1,4-benzoxazine, 6-amino-2H-1,4-benzoxazin-3 (4H)-one, 8-amino-2H-1,4-benzoxazin-3 (4H)-one, 3,4-dihydro-2H-1,4-benzoxazine, 3,4-dihydro-2H-1,4-benzoxazin-6-ol, octahydro-2H-1,4-benzoxazine, 2-methyl-4H-3,1-benzoxazin-4-one, 3,4-dihydro-7-methyl-3-oxo-2H-1,4-benzoxazine-6-sulfonyl chloride, 4-methyl-3-oxo-3,4-dihydro-2H-1,4-benzoxazine-6-sulfonyl chloride, 6-methyl-3-oxo-3,4-dihydro-2H-1,4-benzoxazine-7-sulfonyl chloride, 4-methyl-2H-1,4-benzoxazin-3 (4H)-one, 6-methyl-H-1,4-benzoxazin-3 (4H)-one, 4-methyl-3,4-dihydro-2H-1,4-benzoxazine-7-sulfonyl chloride, 6-amino-4-methyl-2H-1,4-benzoxazin-3 (4H)-one, 7-amino-4-methyl-2H-1,4-benzoxazin-3 (4H)-one, 6-(chloroacetyl)-2H-1,4-benzoxazin-3 (4H)-one, (6-chloro-3-oxo-2,3-dihydro-4H-1,4-benzoxazin-4-yl)acetic acid, 6-acetyl-2H-1,4-benzoxazin-3 (4H)-one, 2-(2-chloroethyl)-3-hydroxy-3,4-dihydro-2H-1,3-benzoxazin-4-one, 7-amino-2,4-dimethyl-2H-1,4-benzoxazin-3 (4H)-one, 7-amino-4-ethyl-2H-1,4-benzoxazin-3 (4H)-one hydrochloride, 6-chloro-2,3-dihydro-3-oxo-4H-1,4-benzoxazine-4-propionic acid, methyl (6-chloro-2H-1,4-benzoxazin-3 (4H)-one-2-yl) acetate, 2,3-dihydro-3-oxo-4H-1,4-benzoxazine-4-propionitrile, 2,3-dihydro-3-oxo-4H-1,4-benzoxazine-4-propionic acid, methyl (2H-1,4-benzoxazin-3 (4H)-one-2-yl) acetate, phenoxazine, 3-(6-methyl-2H-1,4-benzoxazin-3(4H)-one-4-yl)-propionitrile, methyl (6-methyl-2H-1,4-benzoxazin-3 (4H)-one-2-yl)acetate, 9,10-difluoro-2,3-dihydro-3-methyl-7-oxo-7H-pyrido[1,2,3-de]-1,4-benzoxazine-6-carboxylic acid, 2-(3-bromophenyl)-4H-3,1-benzoxazin-4-one, 3-(4-bromophenyl)-2H-1,4-benzoxazine, 4-(4-carboxybenzyl)-2H-1,4-benzoxazin-3(4H)-one, or mixtures thereof.

Thermoplastic Filler Component

In addition to including the liquid epoxy resin and the curable resin filler, the curable composition can include a solid thermoplastic filler component. The thermoplastic polymer filler component can be in the range of from about 5 wt % to about 80 wt % of the curable composition, about 10 wt % to about 25 wt % of the curable composition, or less than, equal to, or greater than about 5 wt %, 10, 15, 20, 25, 30, 35, 40, 45, 50, 55, 60, 65, 70, 75, or about 80 wt % of the curable composition.

The thermoplastic polymer filler component can have a glass transition temperature well above ambient temperature. For example, the glass transition temperature can be in a range from about 100° C. to about 250° C., about 150° C. to about 250° C., or less than, equal to, or greater than about 100° C., 105, 110, 115, 120, 125, 130, 135, 140, 145, 150, 155, 160, 165, 170, 175, 180, 185, 190, 195, 200, 205, 210, 215, 220, 225, 230, 235, 240, 245, or about 250° C.

The thermoplastic polymer filler component can include one or more thermoplastic polymers. The one or more thermoplastic polymers can be the same polymer or different polymers. The thermoplastic filler can also affect the glass transition temperature of the cured product formed from the curable composition.

Examples of suitable thermoplastic polymers of the thermoplastic filler component can include an alkyacrylate such as an alkyl(meth) acrylate, a polyamide-imide, a polyetherimide, a polysulfone, a polyamide, a polyvinylchloride, an acrylonitrile butadiene styrene, a polystyrene, a polyether ether ketone, a polyetherketoneketone, a polytetrafluoroethylene, a polyphenylene sulphide, a polyethylene terephthalate, a polyoxymethylene, a polypropylene, a high density polyethylene, a low density polyethylene, a polypropylene, a siloxane, a polyoxymethylene, a polycarbonate, a polyarylsulfone, a polyethersulfone, a polyphenylsulfone, and mixtures thereof.

Examples of alky(meth) acrylates include monomer components of the acrylic polymer herein which are alkyl (meth)acrylates each having a linear or branched-chain alkyl group, and examples include alkyl (meth)acrylates whose alkyl moiety has 1 to 20 carbon atoms, such as methyl (meth)acrylates, ethyl (meth)acrylates, propyl (meth)acrylates, isopropyl (meth)acrylates, butyl (meth)acrylates, isobutyl (meth)acrylates, s-butyl (meth)acrylates, t-butyl (meth)acrylates, pentyl (meth)acrylates, isopentyl (meth) acrylates, hexyl (meth)acrylates, heptyl (meth)acrylates, octyl (meth) acrylates, 2-ethylhexyl (meth) acrylates, isooctyl (meth)acrylates, nonyl (meth)acrylates, isononyl (meth) acrylates, decyl (meth)acrylates, isodecyl (meth)acrylates, undecyl (meth)acrylates, dodecyl (meth) acrylates, tridecyl (meth) acrylates, tetradecyl (meth) acrylates, pentadecyl (meth) acrylates, hexadecyl (meth)acrylates, heptadecyl (meth) acrylates, octadecyl (meth)acrylates, nonadecyl (meth)acrylates, and eicosyl (meth)acrylates. Among these, alkyl (meth)acrylates whose alkyl moiety has 2 to 14 carbon atoms are preferred, and alkyl (meth)acrylates whose alkyl moiety has 2 to 10 carbon atoms are more preferred.

Examples of polyamide-imides include polymers having a repeating unit represented by the structure of Formula I:

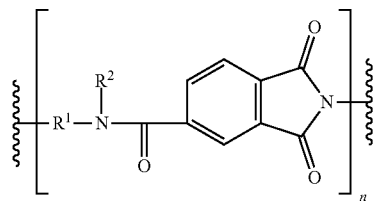

Formula I

In Formula I, $R^1$ is selected from substituted or unsubstituted $(C_1$-$C_{20})$alkylene, $(C_2$-$C_{20})$alkenylene, $(C_4$-$C_{20})$ arylene, $(C_1$-$C_{20})$acylene, $(C_4$-$C_{20})$cycloalkylene, $(C_4$-$C_{20})$ aralkylene, $(C_1$-$C_{20})$alkoxyene, and $(C_1$-$C_{20})$haloalkylene. $R^2$ is selected from substituted or unsubstituted $(C_1$-$C_{20})$ alkyl, $(C_2$-$C_{20})$alkenyl, $(C_4$-$C_{20})$aryl, $(C_1$-$C_{20})$acyl, $(C_4$-$C_{20})$ cycloalkyl, $(C_4$-$C_{20})$aralkyl, $(C_1$-$C_{20})$alkoxy, $(C_1$-$C_{20})$haloalkyl, and —H. The integer n is greater than 1.

Examples of suitable polyetherimides include polymers having a repeating unit represented by the structure according to Formula II.

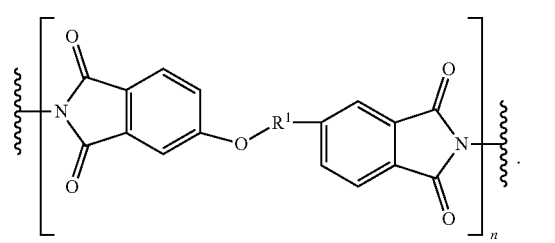

Formula II

In Formula II, $R^1$ is selected from substituted or unsubstituted alkylene, $(C_1$-$C_{20})$alkylene, $(C_2$-$C_{20})$alkenylene, $(C_4$-$C_{20})$arylene, $(C_1$-$C_{20})$acylene, $(C_4$-$C_{20})$cycloalkylene, $(C_4$-$C_{20})$aralkylene, $(C_1$-$C_{20})$alkoxyene, $(C_1$-$C_{20})$haloalkylene, and —$(C_4$-$C_{20})$arylene-$(C_1$-$C_{20})$alkylene-$(C_4$-$C_{20})$ arylene-O—. The integer n is greater than 1. In some examples the —$(C_4$-$C_{20})$arylene-$(C_1$-$C_{20})$alkylene-$(C_4$-$C_{20})$ arylene-O— can have the structure of Formula III.

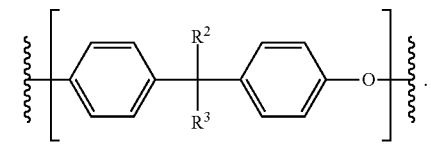

Formula III

In Formula III. $R^2$ and $R^3$ are independently selected from substituted or unsubstituted $(C_1$-$C_{20})$alkyl, $(C_2$-$C_{20})$alkenyl, $(C_4$-$C_{20})$aryl, $(C_1$-$C_{20})$acyl, $(C_4$-$C_{20})$cycloalkyl, $(C_4$-$C_{20})$ aralkyl, $(C_1$-$C_{20})$alkoxy, $(C_1$-$C_{20})$haloalkyl, and —H.

Polysulfones such as, for example, polyarylsulfone, polyethersulfone, and polyphenlysulfone include polymers having a repeating unit represented by the structure of Formula IV.

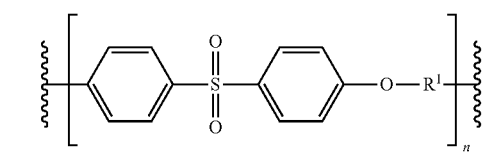

Formula IV

In Formula IV, $R^1$ is selected from substituted or unsubstituted $(C_1$-$C_{20})$alkylene, $(C_2$-$C_{20})$alkenylene, $(C_4$-$C_{20})$ arylene, $(C_1$-$C_{20})$acylene, $(C_4$-$C_{20})$cycloalkylene, $(C_4$-$C_{20})$ aralkylene, $(C_1$-$C_{20})$alkoxyene, and $(C_1$-$C_{20})$haloalkylene, a bond, and —$(C_4$-$C_{20})$arylene-$(C_1$-$C_{20})$alkylene-$(C_4$-$C_{20})$ arylene-O—. The integer n is greater than 1.

Examples of suitable polyamides include a polymer having a repeating unit represented by the structure according to Formula V.

Formula V

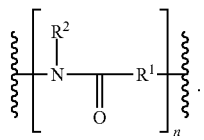

In Formula V, $R^1$ is selected from substituted or unsubstituted $(C_1-C_{20})$alkylene, $(C_2-C_{20})$alkenylene, $(C_4-C_{20})$arylene, $(C_1-C_{20})$acylene, $(C_4-C_{20})$cycloalkylene, $(C_4-C_{20})$aralkylene, $(C_1-C_{20})$alkoxyene, $(C_1-C_{20})$haloalkylene. $R^2$ is selected from substituted or unsubstituted $(C_1-C_{20})$alkyl, $(C_2-C_{20})$alkenyl, $(C_4-C_{20})$aryl, $(C_1-C_{20})$acyl, $(C_4-C_{20})$cycloalkyl, $(C_4-C_{20})$aralkyl, $(C_1-C_{20})$alkoxy, $(C_1-C_{20})$haloalkyl, and —H. The integer n is greater than 1. Examples of suitable polyamides include nylon-6 and nylon 11.

Examples of suitable polyvinylchlorides include a polymer having a repeating structure according to Formula VI.

Formula VI

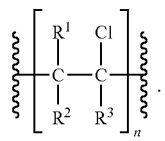

In Formula VI, $R^1$, $R^2$, and $R^3$ are independently selected from substituted or unsubstituted $(C_1-C_{20})$alkyl, $(C_2-C_{20})$alkenyl, $(C_4-C_{20})$ aryl, $(C_1-C_{20})$acyl, $(C_4-C_{20})$cycloalkyl, $(C_4-C_{20})$aralkyl, $(C_1-C_{20})$alkoxy, $(C_1-C_{20})$haloalkyl, and —H. The integer n is greater than 1.

Examples of suitable polystyrenes include a polymer having a repeating structure according to Formula VII.

Formula VII

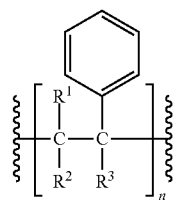

In Formula VII, $R^1$, $R^2$, and $R^3$ are independently selected from substituted or unsubstituted $(C_1-C_{20})$alkyl, $(C_2-C_{20})$alkenyl, $(C_4-C_{20})$aryl, $(C_1-C_{20})$acyl, $(C_4-C_{20})$cycloalkyl, $(C_4-C_{20})$aralkyl, $(C_1-C_{20})$alkoxy, $(C_1-C_{20})$haloalkyl, and —H. The integer n is greater than 1. An example of a suitable polystyrene includes polymer with an acrylonitrile butadiene styrene repeating unit.

Polycarbonates suitable for use in the present disclosure can have any suitable structure. For example, such polycarbonates can include a linear polycarbonate, a branched polycarbonate, a polyester, or a mixture thereof. Such a polycarbonate polymer can include a polycarbonate polyorganosiloxane copolymer, a polycarbonate-based urethane resin, a polycarbonate polyurethane resin, or a mixture thereof.

Examples of a polycarbonate polymer can include an aromatic polycarbonate resin. For example, such aromatic polycarbonate resins can include the divalent residue of dihydric phenols bonded through a carbonate linkage and can be represented by the Formula VIII.

Formula VIII

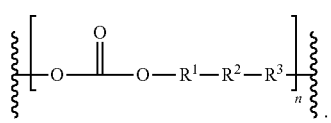

In Formula VIII, $R^1$ and $R^3$ are independently selected from substituted or unsubstituted $(C_5-C_{14})$arylene and a bond. $R^2$ is selected from substituted or unsubstituted $(C_1-C_{40})$alkylene and a bond. The integer n is greater than 1. Examples of suitable monomers to form polycarbonates can include, 4,4'-(propane-2,2'-diyl)diphenol, 1,1-bis(4-hydroxyphenyl)methane, 1,1-bis(4-hydroxyphenyl)ethane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, 2,2-bis(4-hydroxy-1-methylphenyl)propane, 4,4dihydroxybiphenyl, bis(4-hydroxyphenyl)methane, bis(4-hydroxyphenyl)diphenylmethane, 1,2-bis(4-hydroxyphenyl)ethane, 1,1-bis(4-hydroxyphenyl)-1-phenyl ethane, 2-(4-hydroxyphenyl)-2-(3-hydroxyphenyl)propane, bis(4-hydroxyphenyl)phenylmethane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alphabis(4-hydroxyphenyl)toluene, bis(4-hydroxyphenyl)acetonitrile, 1,1-dichloro-2,2-bis(4-hydroxyphenyl)ethylene, 1,1-dibromo-2,2-bis(4-hydroxyphenyl)ethylene, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)flourene, 2-phenyl-3,3-bis-(4-hydroxyphenyl)phthalimidine (PPPBP), 2,2-bis(4-hydroxy-3-bromophenyl)propane, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(5-phenoxy-4-hydroxyphenyl)ethylene, bis-(4-hydroxyphenyl)diphenylmethane), bis(4-hydroxydiphenyl)methane, 2,2-bis(4-hydroxy-3-isopropyl-phenyl)propane, 5,5'-(1-methylethyliden)-bis[1,1'-(bisphenyl)-2-ol]propane, 1,1-bis(4-hydroyphenyl)-3,3,5-trimethyl-cyclohexane, 1,1-bis(4-hydroxyphenyl)-cyclohexane, 2-phenyl-3,3'-bis(4-hydroxyphenyl)phthalimidine, or a mixture thereof.

A polycarbonate of the polycarbonate component can be a polycarbonate homopolymer or copolymer. In examples of the polycarbonate where the polycarbonate component is a polycarbonate copolymer, the repeating units can be selected from any of the bisphenol derivatives described herein and can additionally be selected from resorcinol isophthalate, terephthalate, and siloxane. The repeating units of the polycarbonate copolymer can each be independently in random, block, or alternating configuration.

High-density polyethylenes can include a polymer formed from ethylene monomer repeating units and having a density ranging from about 0.93 to 0.97 $g/cm^3$. Low-density polyethylenes can include a polymer formed from ethylene monomer repeating units and having a density ranging from about 0.91 to 0.94 g/cm³.

A weight average molecular weight of any of the thermoplastic polymers can be in the range of from about 5,000 daltons to about 100,000 daltons, about 10,000 daltons to about 70,000 daltons, or less than, equal to, or greater than about 5,000 daltons, 10,000, 15,000, 20,000, 25,000, 30,000, 35,000, 40,000, 45,000, 50,000, 55,000, 60,000, 65,000, 70,000, 75,000, 80,000, 85,000, 90,000, 95,000, or about 100,000 daltons or more.

As described herein the thermoplastic polymers are largely solid in the curable composition. For example, about 50 wt % to about 100 wt % of the thermoplastic polymers are solid in the curable composition at a temperature of 25° C., about 80 wt % to about 95 wt % of the thermoplastic polymers are solid at a temperature of 25° C., or less than, equal to, or greater than about 50 wt %, 55, 60, 65, 70, 75, 80, 85, 90, 95, or about 100 wt % of the thermoplastic polymers are solid at a temperature of 25° C.

Curative Component

The curable composition also includes a curative component. The curative component functions, at least in part, to cure and join the liquid epoxies and curable resin fillers. The curative component can be in a range of from about 5 wt % to about 80 wt % of the curable composition, about 15 wt % to about 55 wt %, or less than, equal to, or greater than about 5 wt %, 10, 15, 20, 25, 30, 35, 40, 45, 50, 55, 60, 65, 70, 75, or about 80 wt % of the curable composition.

The curative component can include one or more curative compounds. The one or more curative compounds can be chosen from an aliphatic polyamine compound, an aromatic polyamine compound, an aromatic polyamide compound, an alicyclic polyamine compound, a polyamine compound, a polyamide compound, an amino resin compound, a 9,9-bis(aminophenyl)fluorene compound, and a mixture thereof.

According to some examples, the 9,9-bis(aminophenyl) fluorene compound has the structure as shown in Formula IX.

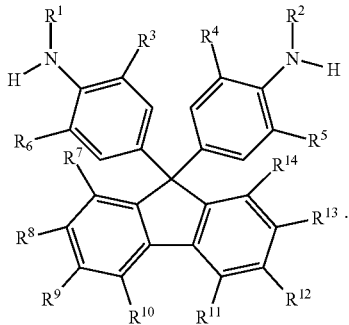

Formula IX

In Formula IX, $R^1$, $R^2$, $R^3$, $R^4$, $R^5$, $R^6$, $R^7$, $R^8$, $R^9$, $R^{10}$, $R^{13}$, and $R^{14}$ are independently selected from substituted or unsubstituted $(C_1-C_{20})$alkyl, $(C_2-C_{20})$alkenyl, $(C_4-C_{20})$aryl, $(C_1-C_{20})$acyl, $(C_4-C_{20})$cycloalkyl, $(C_4-C_{20})$aralkyl, $(C_1-C_{20})$alkoxy, $(C_1-C_{20})$haloalkyl, and —H. In specific examples, the 9,9-bis(aminophenyl)fluorene compound can be chosen from 9,9-bis(4-aminophenyl)fluorene, 4-methyl-9,9-bis(4-aminophenyl)fluorene, 4-chloro-9,9-bis(4-aminophenyl)fluorene, 2-ethyl-9,9-bis(4-aminophenyl)fluorene, 2-iodo-9,9-bis(4-aminophenyl)fluorene, 3-bromo-9,9-bis(4-aminophenyl)fluorene, 9-(4-methylaminophenyl)-9-(4-ethylaminophenyl)fluorene, 1-chloro-9,9-bis(4-aminophenyl)fluorene, 2-methyl-9,9-bis(4-aminophenyl) fluorene, 2,6-dimethyl-9,9-bis(4-aminophenyl)fluorene, 1,5-dimethyl-9,9-bis(4-aminophenyl)fluorene, 2-fluoro-9,9-bis (4-aminophenyl)fluorene, 1,2,3,4,5,6,7,8-octafluoro-9,9-bis (4-aminophenyl)fluorene, 2,7-dinitro-9,9-bis(4-aminophenyl)fluorene, 2-chloro-4-methyl-9,9-bis(4-aminophenyl)fluorene, 2,7-dichloro-9,9-bis(4-aminophenyl) fluorene, 2-acetyl-9,9-bis(4-aminophenyl)fluorene, 2-methyl-9,9-bis(4-methylaminophenyl)fluorene, 2-chloro-9,9-bis(4-ethylaminophenyl)fluorene, 2-t-butyl-9,9-bis(4-methylaminophenyl)fluorene, 9,9-bis(3-methyl-4-aminophenyl)fluorene, and 9-(3-methyl-4-aminophenyl)-9-(3-chloro-4-aminophenyl)fluorene, 9-bis(3-methyl-4-aminophenyl)fluorene, 9,9-bis(3-ethyl-4-aminophenyl) fluorene, 9,9-bis(3-phenyl-4-aminophenyl)fluorene, 9,9-bis (3,5-dimethyl-4-methylaminophenyl)fluorene, 9,9-bis(3,5-dimethyl-4-aminophenyl)fluorene, 9-(3,5-dimethyl-4-methylaminophenyl)-9-(3,5-dimethyl-4-aminophenyl) fluorene, 9-(3,5-diethyl-4-aminophenyl)-9-(3-methyl-4-aminophenyl)fluorene, 1,5-dimethyl-9,9-bis(3,5-dimethyl-4-methylaminophenyl)fluorene, 9,9-bis(3,5-diisopropyl-4-aminophenyl)fluorene, 9,9-bis(3-chloro-4-aminophenyl) fluorene, 9,9-bis(3,5-dichloro-4-aminophenyl)fluorene, 9,9-bis(3,5-diethyl-4-methylaminophenyl)fluorene, 9,9-bis(3,5-diethyl-4-aminophenyl)fluorene, and a mixture thereof.

Core-Shell Rubber Nanoparticles

The curable composition can additionally include one or more core-shell rubber nanoparticles. The one or more core-shell rubber nanoparticles can help to add structure and resiliency in the cured article formed from the curable composition. The core-shell rubber nanoparticles can be in the range of from about 1 wt % to about 40 wt % of the curable composition, about 2 wt % to about 20 wt %, or less than, equal to, or greater than about 1 wt %, 5, 10, 15, 20, 25, 30, 35, or about 40 wt % of the curable composition.

A core-shell nanoparticle can refer generally to a polymeric nanoparticle with at least two defined regions, in which one region (called herein the core) is substantially surrounded by another region (called herein the shell). The core region and the shell region can each have one or more layers. The core and shell can include many types of polymeric materials. The core and shell can include the same polymers or different polymers.

Suitable examples of monomers that can form the polymers of the core and shell include monomers of alkenylbenzene, conjugated diene units, acrylates, diacrylates, triacrylates, and rubber. Examples of alkenylbenzene monomers can include styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, and t-butoxystyrene, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons. Examples of conjugated diene monomers can include $C_4-C_8$ conjugated diene monomers such as 1,3-butadiene, isoprene, and 1,3-pentadiene.

An average particle diameter of the individual core-shell rubber nanoparticles can be in a range from 0.01 μm to 1 μm, about 0.10 μm to about 0.80 μm, or less than, equal to, or greater than 0.01 μm, 0.05, 0.1, 0.15, 0.2, 0.25, 0.3, 0.35, 0.4, 0.45, 0.5, 0.55, 0.6, 0.65, 0.7, 0.75, or about 0.8 μm. The individual core-shell rubber nanoparticles can have a glass transition temperature ranging from about −70° C. to about 200° C. for each individual layer, about 0° C. to about 120°

C., or less than, equal to, or greater than about −70° C., −65, −60, −55, −50, −45, −40, −35, −30, −25, −20, −15, −10, −5, 0, 5, 10, 15, 20, 25, 30, 35, 40, 45, 50, 60, 65, 70, 75, 80, 85, 90, 95, 100, 105, 110, 115, 120, 125, 130, 135, 140, 145, 150, 155, 160, 165, 170, 175, 180, 185, 190, 195, or about 200° C. for each individual shell layer.

Method of Making the Curable Composition

The curable composition can be made in many suitable manners. For example, the curable composition can be made by adding a suitable amount of any of the curative components described herein to a first solution. The first solution can be optionally mixed at any speed suitable to mix the components therein.

The first solution can include many combinations of the components described herein. For example, the first solution can include any of the curable resin fillers, liquid epoxy resins, and core-shell rubber nanoparticles described herein. The first solution can be optionally mixed before the curative components are added. The first solution can also be heated. The first solution is generally heated to a temperature that is below a melting point of the curative resin filler. For example, the first solution can be heated at a temperature in range from about 25° C. to about 150° C., about 80° C. to about 130° C., or less than, equal to, or greater than about 25° C., 30, 35, 40, 45, 50, 55, 60, 65, 70, 75, 80, 85, 90, 95, 100, 105, 110, 115, 120, 125, 130, 135, 140, 145, or about 150° C. The first solution can be mixed for any suitable amount of time such as a time ranging from about 1 second to about 5 minutes after mixing the second solution, about 1 second to about 30 seconds after mixing the second solution, or less than, equal to, or greater than about 1 second, 5 seconds, 10 seconds, 15 seconds, 20 seconds, 25 seconds, 30 seconds, 35 seconds 40 seconds, 45 seconds, 50 seconds, 55 seconds, 1 minute, 2 minutes, 3 minutes, 4 minutes, or about 5 minutes. If the curative components are not already present in the first solution, adding the curative components to the first solution forms a second solution. The second solution can be optionally mixed at any suitable speed.

The method can further include adding any of the thermoplastic resins described herein to the first solution or second solution. If added to the second solution, the thermoplastic resins can be added to the second solution immediately after the curative component is added to the first solution. For example, the thermoplastic resins can be added to the second solution about 1 second to about 5 minutes after mixing the second solution, about 1 second to about 30 seconds after mixing the second solution, or less than, equal to, or greater than about 1 second, 5 seconds, 10 seconds, 15 seconds, 20 seconds, 25 seconds, 30 seconds, 35 seconds 40 seconds, 45 seconds, 50 seconds, 55 seconds, 1 minute, 2 minutes, 3 minutes, 4 minutes, or about 5 minutes after mixing the second solution. After the thermoplastic resins are added, the second solution can be mixed further at any suitable speed to form a flowable mixture of the first solution or second solution or both solutions. In some examples, the first solution, second solution or both solutions are mixed in an extruder, further to form the curable film adhesive through extrusion. The curable film adhesive is allowed to cool (e.g., to about 25° C.) to form a tacky film. In the tacky film, components such as the curable resin filler component, curative component, thermoplastic resins remain solid.

Structural Adhesive Film

In some examples, the curable film adhesive can be a structural film adhesive. The structural film adhesive film can be used to facilitate many different types of bonding. For example, the structural film adhesive can facilitate metal to metal bonding, composite to composite bonding, or metal to composite bonding. The structural film adhesive can be stored in a container and applied directly from the container to a substrate for use.

Alternatively, the structural film adhesive can be applied to a releasable backing layer. The backing layer can protect the adhesive film during storage (e.g., by allowing the adhesive film to be stored in a roll) and can also help to determine the area that the film is applied to. For example, the backing can be formed to have any suitable dimensions with respect to length and width that correspond to the length and width of a desired substrate. While not so limited, the length of the backing can be in a range of from about 0.1 m to about 100 m, about 1.8 m to about 57 m, about 5 m to about 30 m, or less than, equal to, or greater than about 0.1 m, 0.5, 0.8, 1, 1.5, 1.8, 2, 2.5, 3, 3.5, 4, 4.5, 5, 10, 15, 20, 25, 30, 35, 40, 45, 50, 55, 60, 65, 70, 75, 80, 85, 90, 95, or about 100 m. Additionally, a width of the backing can be in a range of from about 0.1 m to about 100 m, about 1.8 m to about 57 m, about 5 m to about 30 m, or less than, equal to, or greater than about 0.1 m, 0.5, 0.8, 1, 1.5, 1.8, 2, 2.5, 3, 3.5, 4, 4.5, 5, 10, 15, 20, 25, 30, 35, 40, 45, 50, 55, 60, 65, 70, 75, 80, 85, 90, 95, or about 100 m.

The structural adhesive film, as applied to the backing, can have any suitable thickness. For example, the thickness can be in a range of from about 0.1 mm to about 1.20 mm, about 0.24 mm to 0.33 about, or less than, equal to, or greater than about 0.1 mm, 0.2, 0.25, 0.30, 0.35, 0.40, 0.45, 0.50, 0.55, 0.60, 0.65, 0.70, 0.75, 0.80, 0.85, 0.90, 0.95, 1.00, 1.05, 1.10, 1.15, or 1.20 mm. The structural adhesive film can be used for many applications such as in aerospace application. For example the structural adhesive film can be used on an airplane.

Cured Product

The curable composition, or structural adhesive film including the curable composition, described herein can be applied to any substrate in many different forms. For example, the curable composition can be applied to a substrate as a film. The film can be cured to adhere any substrates together or to coat or strengthen any substrate.

The cured product can be tuned to have any suitable thickness. For example, a thickness of the cured product can be in a range from about 2 mm to about 15 mm, about 5 mm to about 10 mm, or less than, equal to, or greater than about 2 mm, 3, 4, 5, 6, 7, 8, 9, 10, 11, 12, 13, 14, or about 15 mm. The substrate can be a metal, a plastic, a ceramic, or a mixture thereof. The substrate can be located on an engine or machine that is subjected to extreme temperatures, extreme changes in temperatures, or extreme changes in moisture levels. As an example, the substrate can located in an aerospace machine such as an airplane, helicopter, or space vehicle.

The cured product can have a Wet Glass Transition temperature and a Dry Glass Transition Temperature that are substantially equal. For example, the Wet Glass Transition Temperature and the Dry Glass Transition Temperature can be exactly the same, within 0.1° C. to about 30° C. of each other, about 0.5° C. to about 2° C. of each other, or about 0.1° C., 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, or about 30° C. of each other. The Wet Glass Transition Temperature and the Dry Glass Transition Temperature of the cured product can independently be in the range of from about 100° C. to about 300° C. about 150° C. to about 275° C., or less than, equal to, or greater than about 100° C., 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, or about 275° C. As understood, "Wet Glass Transition Temperature" refers to the glass transition temperature of the cured product when the cured product is saturated or otherwise exposed to moisture. As understood, "Dry Glass Transition Temperature" refers to the glass transition temperature of the cured product when the cured product is substantially free of exposure to moisture or otherwise unsaturated.

The cured product can also experience limited breakdown and maintain adhesion at elevated temperatures. For example, cured products formed from the curable composition including the curable resin filler component can have improved heat resistance. For instance the cured products can function at a temperature ranging from about 200° C. to about 800° C., about 300° C. to about 400° C., or less than, equal to, or greater than about 200° C., 250, 300, 350, 400, 450, 500, 550, 600, 650, 700, 750, or 800° C. The cured product in general can function at a higher temperature than a corresponding cured product formed from a curable composition that is free of the curable resin filler component resin (e.g., a bismaleimide or derivative thereof).

Method of Curing

The curable composition can be cured in many suitable ways. For example, the curable composition can be cured by increasing the temperature of the cured composition. The temperature can be increased by about 100° C. to about 400° C., about 150° C. to about 300° C., or less than, equal to, or greater than about 100° C., 110, 120, 130, 140, 150, 160, 170, 180, 190, 200, 210, 220, 230, 240, 250, 260, 270, 280, 290, 300, 310, 320, 330, 340, 350, 360, 370, 380, 390, or about 400° C. to achieve a curing temperature in range from about 100° C. to about 400° C. The temperature can be increased at a rate of about 1° C./min to about 10° C./min, about 1° C./min to about 3° C./min, or less than, equal to, or greater than about 1° C./min, 1.5, 2, 2.5, 3, 3.5, 4, 4.5, 5, 5.5, 6, 6.5, 7, 7.5, 8, 8.5, 9, 9.5, or about 10° C./min.

During curing, a pressure in the environment surrounding the curable composition (e.g., in an autoclave) can be brought to about 100 kPa to about 110 kPa. In achieving the final pressure, the pressure can be increased or reduced (e.g., by creating a vacuum or otherwise reduced pressure environment) by about 100 kPa to about 400 kPa, about 200 kPa to about 300 kPa, or less than, equal to, or greater than about 100 kPa, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, or about 400 kPa. At least one of the final curing temperature and the final curing pressure can be maintained for about 30 minutes to about 600 minutes, about 60 minutes to about 200 minutes, or less than, equal to, or greater than about 30 minutes, 60, 90, 100, 130, 160, 190, 200, 230, 260, 290, 300, 330, 360, 390, 400, 430, 460, 490, 500, 530, 560, 590, or about 600 minutes.

Curing the curable composition through an increase in temperature. Once activated, the curative components bond with the liquid epoxies and curable resin fillers. The curative components, curable resin fillers and the liquid epoxies can join through a Michael addition reaction or through cross-linking to form an integrated polymer network. If present, the thermoplastic resin components and core-shell rubber nanoparticles can be distributed throughout the cured product. The thermoplastic resin component and core-shell rubber nanoparticles can be homogenously or heterogeneously distributed throughout the cured product.

EXAMPLES

Various embodiments of the present disclosure can be better understood by reference to the following Examples which are offered by way of illustration. The present disclosure is not limited to the Examples given herein.

Objects and advantages of this disclosure are further illustrated by the following non-limiting examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight.

TABLE 1

| Materials | | |
|---|---|---|
| Designation | Description | Source |
| BMI | 4,4'-Bismaleimido-diphenylmethane | TCI America, Portland, OR |
| CAF | 9,9-Bis(3-chloro-4-aminophenyl)fluorene | TCI America, Portland, OR |
| DABPA | Diallyl bisphenol A | Huntsman Advanced Materials Americas Inc., The Woodlands, TX |
| DDS | 4,4'-Diamino diphenyl sulfone | Huntsman Advanced Materials Americas Inc., The Woodlands, TX |
| EC-3917 | A structural adhesive primer available under the trade designation "SCOTCH-WELD STRUCTURAL ADHESIVE PRIMER EC-3917" | 3M Co., St. Paul, MN |
| EPALLOY 9000 | 1,1,1-tris-(p-Hydroxyphenyl) ethane glycidyl ether, available under the trade designation "EPALLOY 9000" | CVC Thermoset Specialties, Moorestown, NJ |
| MX 215 | Phenolic novolac epoxy resin with a core shell rubber toughener " having an approximate epoxy equivalent weight of 232 g/mol, obtained under the trade designation "MX 215 | Kaneka Corporation, Pasadena, TX |
| MX 257 | Diglycidyl ether of bisphenol A with a core shell rubber toughener having an approximate epoxy equivalent weight of 298 g/mol, obtained under the trade designation "MX 257" | Kaneka Corporation, Pasadena, TX |
| MX 416 | Multifunctional tetraglycidyl methylene dianiline ("TGMDA") epoxy with a core shell rubber toughener having an approximate equivalent weight of 148 g/mol, obtained under the trade designation "MX 416" | Kaneka Corporation, Pasadena, TX |
| PES | Polyether sulfone obtained under the trade designation "ULTRASON E 2020 P SR MICRO" | BASF Corp., Ludwigshafen, Germany |

TABLE 1-continued

Materials

| Designation | Description | Source |
|---|---|---|
| Aluminum panel | Grade 2024T3 bare aluminum panel of various sizes specified for each test were used to generate all overlap shear and floating roller peel data for all examples. | Erickson Metals of Minnesota, Inc., Coon Rapids, MN |

Test Methods

FPL Etched and Phosphoric Acid Anodized Aluminum Substrate

Grade 2024T3 bare aluminum panels of various sizes specified for each test were used to generate all overlap shear ("OLS") and floating roller peel ("FRP") data for all examples.

Prior to bonding with structural adhesive, Grade 2024T3 bare aluminum panels were subjected to the following surface preparation process:
1) soaking for 10 minutes in OAKITE 165 CAUSTIC WASH SOLUTION (available from Chemetall GmbH, Germany) at a temperature of 85° C.;
2) the panels (in a rack) were then submerged in tank of deionized water for 10 minutes; 3) the panels were spray rinsed with deionized water for 2-3 minutes;
4) the panels were then soaked in a tank of "FPL ETCH" (a hot solution of sulfuric acid and sodium dichromate from Forest Products Laboratory of Madison, Wis.) at 66° C. for 10 minutes;
5) the panels were spray rinsed with deionized water for 2-3 minutes; and
6) the panels were allowed to drip dry for 10 minutes at ambient temperature, and then for 30 minutes in a re-circulating air oven at 54° C.

In all cases, the panels were further treated as follows. The etched panels were anodized by immersion in phosphoric acid at 22° C. with an applied voltage of 15 volts for 20-25 minutes, followed by rinsing with tap water (test for water break), air drying for 10 minutes at room temperature, then oven drying in a forced air oven at 66° C. for 10 minutes. The resulting anodized aluminum panels were then primed within 24 hours of treatment. The anodized panels were primed with a corrosion inhibiting primer for aluminum ("3M SCOTCH-WELD STRUCTURAL ADHESIVE PRIMER EC-3917", available from 3M, St. Paul, Minn.) according to the manufacturer's instructions to give a dried primer thickness of between 0.00005 and 0.00015 inches (1.3 and 3.9 micrometers).

Overlap Shear ("OLS") Testing for Adhesive Film

Primed panels of 2024-T3 bare aluminum measuring 4 inches long times 7 inches wide times 0.063 inches thick (10.16 times 17.78 times 0.16 centimeters) were prepared for testing as described above in "FPL Etched and Phosphoric Acid Anodized Aluminum Substrate". The primed panels were bonded to one another in an overlapping relationship along their lengthwise dimension using a 15.9 mm wide strip of adhesive film. After removing the liner from one side, the adhesive film was applied to the first substrate by hand using a small rubber roller in such a manner as to exclude entrapped air and ensure intimate contact between the exposed adhesive and the substrate. After removing the second liner, the second adherend was placed in contact with the exposed adhesive surface to give an assembly with an overlap of 0.5 inches (12.7 mm). The resulting assembly was fastened together using tape and cured in an autoclave in one of the cure cycles described above. The bonded panels were sawn across their width into 1 inch (2.54 cm) wide strips and evaluated for overlap shear strength in accordance with ASTM D-1002-10 using a grip separation rate of 0.05 inches/minute (1.3 millimeters/minute) using a tensile tester. Testing was conducted at room temperature (75° F. (24° C.)). A SINTECH 30 test machine (MTS Corporation, Eden Prairie, Minn.) was used for Overlap Shear Testing in accordance with ASTM D-1002-10.

Floating Roller Peel ("FRP") Strength Test for Adhesive Film

Primed panels of 2024-T3 bare aluminum measuring 8 inches long times 3 inches wide times 0.063 inches thick (20.3 times 7.6 times 0.16 centimeters), and 10 inches long times 3 inches wide times 0.025 inches thick (25.4 times 7.6 times 0.064 centimeters), were prepared for testing as described above in "FPL Etched and Phosphoric Acid Anodized Aluminum Substrate". The primed panels were bonded together using the same film adhesive and cure cycle employed for the overlap shear samples, then evaluated for floating roller peel strength in accordance with ASTM D-3167-76 with the following modification. Test strips measuring 0.5 inch (12.7 cm) wide were cut along the lengthwise direction of the bonded aluminum panels. A tensile testing machine operated at a rate of 6 inches/minute (30.5 cm/minute) was used to peel the thinner substrate from the thicker one, and the results normalized to a width of one inch, to give pounds per inch width ("piw"), and also converted to Newton per 25 mm ("N/25 mm"). A SINTECH 20 test machine (MTS Corporation, Eden Prairie, Minn.) was used for Floating Roller Peel Testing in accordance with ASTM D-3167-76.

Autoclave Cure Cycle

After applying a vacuum to reduce the pressure to about 28 inches of mercury (95 kPa), an external pressure about 45 psi (310 kPa) was applied and the temperature of the autoclave was heated from about room temperature (72° F. (22° C.)) to 380° F. (193° C.) at a rate of 4.5° F./minute (2.5° C./minute). The vacuum was released when the pressure reached about 15 psi (103.4 kPa). The final temperature and pressure were maintained for 180 minutes before cooling to room temperature at a rate of 5° F./minute (2.8° C./minute) at which point the pressure was released and a cured joined structure was obtained.

Adhesive Films Formulations

Example 1

A 38 g portion of MX 257 in a plastic cup was warmed in a 300° F. (149° C.) oven, then 12 g of BMI was added and the mixture was agitated to uniformity using a high-speed mixer. Immediately 12 g of PES was added, and the mixture was shear mixed in a high-speed mixer. Then 17 g CAF was added and mixed in using a high-speed mixer for less than 90 seconds. The mixture was immediately used to draw a film on a silicone coated liner. A tacky film was achieved.

Example 2

A 19 g portion of MX 257 and a 12 g portion of MX 416 in a plastic cup were mixed together and then warmed in a 300° F. (149° C.) oven, and then 12 g of BMI was added and the mixture was agitated to uniformity using a high-speed mixer. Immediately 12 g of PES was added, and the mixture was shear mixed using the high-speed mixer. Then 17 g CAF was added and mixed in using the high-speed mixer for less than 90 seconds. The mixture was immediately used to draw a film on a silicone coated liner. A tacky film was achieved.

Example 3

A 38 g portion of MX 257 in a plastic cup was warmed in a 300° F. (149° C.) oven, then 12 g BMI was added and the mixture was agitated to uniformity using a high-speed mixer. 10 g of DABPA was added and mixed well, and immediately 12 g of PES and was added, and the mixture was shear mixed using the high-speed mixer. A 17 g portion of CAF was added and mixed in using the high-speed mixer for less than 90 seconds. The mixture was immediately used to draw a film on a silicone coated liner. A tacky film was achieved.

Example 4

A 38 g portion of MX 257 in a plastic cup was warmed in a 300° F. (149° C.) oven, then 12 g BMI was added agitated to uniformly using high-speed mixer in the plastic cup. Immediately 12 g of PES was added, and shear mixed in a high-speed mixer. The 15.4 g OTBAF was added and also mixed using a high-speed mixer less than 90 seconds. The mixture was immediately used to draw a film on a silicone coated liner. A tacky film was achieved.

Example 5

A 36 g portion of MX 416 in a plastic cup was warmed in a 300° F. (149° C.) oven, then 24 g BMI was added and the mixture was agitated to uniformity using a high-speed mixer. Immediately 24 g of PES was added, and shear mixed in using the high-speed mixer. The 17 g of CAF was added and also mixed in using the high-speed mixer for less than 90 seconds. The mixture was immediately used to draw a film on a silicone coated liner. A tacky film was achieved.

Comparative Example 1

A 19 g portion of MX 257 and a 12 g portion of MX 416 were mixed together in a plastic cup and warmed in a 250° F. (121° C.) oven. 12 g of PES was then added, and the mixture was shear mixed in a high-speed mixer. Then 17 g CAF was added and the mixture was further mixed using the high-speed mixer for less than 90 seconds. The mixture was immediately used to draw a film on a silicone coated liner. A tacky film was achieved.

Comparative Example 2

First 38 g MX 257 was warmed in a 300° F. (149° C.) oven, then 12 g PES was added agitated to uniformly using high-speed mixer in the plastic cup, then put into 300° F. (149° C.) oven. After 20-30 minutes, a majority of the PES dissolved. Then 12 g of BMI was added, and shear mixed in a high-speed mixer. The mixture was put back into the oven to allow the BMI to melt. After the BMI was melted (e.g., substantially no liquid BMI remaining), 17 g CAF was added and also mixed using a high-speed mixer for less than 90 seconds. The mixture was immediately used to draw a film on the silicone coated liner. The film was difficult to make and could not make a homogeneous film.

Samples from Examples 1 to 8 and Comparative Example 1 were tested for Overlap Shear (OLS) and Floating Roller Peel (FRP) strength, with results as summarized in Table 2.

TABLE 2

| | OLS and FRP results | | | | | | |
|---|---|---|---|---|---|---|---|
| | OLS at 24° C., Mpa | OLS at 149° C., Mpa | OLS at 24° C., Mpa | OLS at 149° C., Mpa | OLS at 177° C., Mpa | OLS at 204.5° C., Mpa | FRP at 24° C., piw (N/25 mm) |
| | No EC-3917 primer | | Primed with EC-3917 | | | | |
| Comparative Example 1 | NT | NT | 28.9 | 21.2 | 22.4 | NT | 6 (26) |
| Example 1 | 36.1 | 22.5 | 23.85 | NT | 13.97 | 6.1 | 38.4 (171) |
| Example 2 | 40.7 | 35.7 | 33.4 | NT | 22.49 | 14.02 | 23.3 (104) |
| Example 3 | 41.4 | 26.1 | 39.6 | NT | 22.9 | 9.2 | 10 (44) |
| Example 4 | NT | NT | 37.8 | NT | 22.86 | 12.9 | 10 (44) |
| Example 5 | NT | NT | 23.3 | NT | 31.5 | 25.7 | 2.1 (9.2) |

In Table 2, "NT" represents "Not Tested"

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

Additional Embodiments

The following exemplary embodiments are provided, the numbering of which is not to be construed as designating levels of importance:

Embodiment 1 provides a curable composition comprising:
 a liquid epoxy resin component;
 a curative component; and
 a curable resin filler component, at least a portion of which is dispersed in the liquid epoxy resin and solid at about 25° C.

Embodiment 2 provides the curable composition of Embodiment 1, wherein the curable composition is a curable film.

Embodiment 3 provides the curable composition of any one of Embodiments 1 or 2, wherein the liquid epoxy resin component is in the range of from about 20 wt % to about 90 wt % of the curable composition.

Embodiment 4 provides the curable composition according to any one of Embodiments 1-3, wherein the liquid epoxy resin component is in the range of from about 25 wt % to about 70 wt % of the curable composition.

Embodiment 5 provides the curable composition according to any one of Embodiments 1-4, wherein the liquid epoxy resin component comprises one or more epoxy resins.

Embodiment 6 provides the curable composition of Embodiment 5, wherein the one or more epoxy resins are chosen from a diglycidyl ether of bisphenol F, a low epoxy equivalent weight diglycidyl ether of bisphenol A, a liquid epoxy novolac, a liquid aliphatic epoxy, a liquid cycloaliphatic epoxy, a 1,4-cyclohexandimethanoldiglycidylether, 3,4-epoxycyclohexylmethyl-3,4-epoxycyclohexane carboxylate, tetraglycidylmethylenedianiline, N,N,N',N'-tetraglycidyl-4,4'-methylenebisbenzenamine, a triglycidyl of para-aminophenol, N,N,N',N'-tetraglycidyl-m-xylenediamine and a mixture thereof.

Embodiment 7 provides the curable composition according to any one of Embodiments 1-6, wherein the curable resin filler component is in the range of from about 2 wt % to about 70 wt % of the curable composition.

Embodiment 8 provides the curable composition according to any one of Embodiments 1-7, wherein the curable resin filler component is in the range of from about 10 wt % to about 25 wt % of the curable composition.

Embodiment 9 provides the curable composition according to any one of Embodiments 1-8, wherein the curable resin filler component is heterogeneously dispersed in the liquid epoxy resin component.

Embodiment 10 provides the curable composition according to any one of Embodiments 1-9, wherein the liquid epoxy resin component is homogenously dispersed in the composition.

Embodiment 11 provides the curable composition according to any one of Embodiments 1-10, wherein the portion of the curable resin filler component that is solid in the liquid epoxy resin is in the range of from about 5 wt % to about 100 wt % of the curable resin filler component.

Embodiment 12 provides the curable composition according to any one of Embodiments 1-11, wherein the portion of the curable resin filler component that is solid in the liquid epoxy resin is in the range of from about 80 wt % to about 95 wt % of the curable resin filler component.

Embodiment 13 provides the curable composition according to any one of Embodiments 1-12, wherein the curable resin filler has a melting point in the range of from about 50° C. to about 250° C.

Embodiment 14 provides the curable composition according to any one of Embodiments 1-13, wherein the curable resin filler has a melting point in the range of from about 100° C. to about 200° C.

Embodiment 15 provides the curable composition according to any one of Embodiments 1-14, wherein the curable resin filler component comprises one or more resins.

Embodiment 16 provides the curable composition of Embodiment 15, wherein the one or more resins are chosen from a solid epoxy resin, a bismaleimide resin, a polyimide resin, a cyanate ester resin, a benzoxazine resin, and a mixture thereof.

Embodiment 17 provides the curable composition of Embodiment 16, wherein the bismaleimide resin is chosen from N,N'-(ethylene)-bismaleimide, N,N'-(hexamethylene)-bismaleimide, N,N'-(dodecamethylene)-bismaleimide, N,N'-(2,2,4 trimethyl-hexamethylene)-bismaleimide, N,N'-(oxydipropylene)-bismaleimide, N,N'-(amino-di-propylene) bismaleimide, N,N'-(1,3-cyclohexylene)-bismaleimide, N,N'-(1,4-cyclo-hexylene)-bismaleimide, N,N'-(methylene-1,4-dicyclohexylene)-bismaleimide, N,N'-(3,3'-dimethyl-4, 4'-biphenylene)-bismaleimide, N,N'-(m-phenylene)-bismaleimide, N,N'-(p-phenylene)-bismaleimide, N,N'-(o-phenylene)-bismaleimide, N,N'-(1,3-naphthylene)-bismaleimide, N,N'-(1,4-naphthylene)-bismaleimide, N,N'-(1,5-naphthylene)-bismaleimide, N,N'-(4,6-dimethyl-1,3-phenylene)-bismaleimide, N,N'-(2,4-toluylene) bismaleimide, N,N'-(2,6-toluylene)-bismaleimide, N,N'-(methylene-di-p-phenylene)-bismaleimide, N,N'-(oXydipropylene)-bismaleimide, N,N'-(oxy-di-p-phenylene)bismaleimides, N,N'-(4,4'-diphenylmethane) bismaleimides, N,N'-(4,4'-diphenylether)-bismaleimide, N,N'-(4,4'-diphenylsulfone)-bismaleimide and N,N'-(4,4' diphenyldithio)-bismaleimide, N,N'-(m-phenylene)-bismaleimide, N,N'-(4, 4'-diphenylmethane)-bismaleimide, and a mixture thereof.

Embodiment 18 provides the curable composition according to any one of Embodiments 1-17, further comprising a thermoplastic polymer filler component.

Embodiment 19 provides the curable composition of Embodiment 18, wherein the thermoplastic polymer filler component is in the range of from about 5 wt % to about 80 wt % of the curable composition.

Embodiment 20 provides the curable composition according to any one of Embodiments 18 or 19, wherein the thermoplastic polymer filler component is in the range of from about 10 wt % to about 25 wt % of the curable composition.

Embodiment 21 provides the curable composition according to any one of Embodiments 18-20, wherein the thermoplastic polymer filler component has a glass transition temperature in the range of from about 100° C. to about 250° C.

Embodiment 22 provides the curable composition according to any one of Embodiments 18-21, wherein the thermoplastic polymer filler component has a glass transition temperature in the range of from about 150° C. to about 250° C.

Embodiment 23 provides the curable composition of Embodiment 18, wherein the thermoplastic polymer filler component comprises one or more thermoplastic polymers.

Embodiment 24 provides the curable composition of Embodiment 23, wherein the one or more thermoplastic polymers are chosen from an acrylate, an alkyl(meth) acrylate, a polyamide-imide, a polyetherimide, a polysulfone, a polyamide, a polyvinylchloride, an acrylonitrile butadiene styrene, a polystyrene, a polyether ether ketone, a polyetherketoneketone, a polytetrafluoroethylene, a polyphenylene sulphide, a polyethylene terephthalate, a polyoxymethylene, a polypropylene, a high density polyethylene, a low density polyethylene, a polypropylene, a siloxane, a polyoxymethylene, a polycarbonate, a polyarylsulfone, a polyethersulfone, a polyphenlysulfone, and a mixture thereof.

Embodiment 25 provides the curable composition according to any one of Embodiments 23 or 24, wherein a weight average molecular weight of at least one of the thermoplastic polymers is in the range of from about 5,000 daltons to about 100,000 daltons.

Embodiment 26 provides the curable composition according to any one of Embodiments 23-25, wherein a weight average molecular weight of at least one of the thermoplastic polymers is in the range of from about 10,000 daltons to about 70,000 daltons.

Embodiment 27 provides the curable composition of any one of Embodiments 23-26, wherein about 50 wt % to about 100 wt % of the one or more thermoplastic polymers are solid in the curable composition at a temperature of 25° C.

Embodiment 28 provides the curable composition of any one of Embodiments 23-27, wherein about 80 wt % to about 95 wt % of the one or more thermoplastic polymers are solid at a temperature of 25° C.

Embodiment 29 provides the curable composition according to any one of Embodiments 1-28, wherein the curative component is in the range of from about 5 wt % to about 80 wt % of the curable composition.

Embodiment 30 provides the curable composition according to any one of Embodiments 1-29, wherein the curative component is in the range of from about 15 wt % to about 55 wt % of the curable composition.

Embodiment 31 provides the curable composition according to any one of Embodiments 1-30, wherein the curative component comprises one or more curative compounds.

Embodiment 32 provides the curable composition of Embodiment 31, wherein the one or more curative compounds are chosen from an aliphatic polyamine compound, an aromatic polyamine compound, an aromatic polyamide compound, an alicyclic polyamine compound, a polyamine compound, a polyamide compound, an amino resin compound, a 9,9-bis(aminophenyl)fluorene compound, and a mixture thereof.

Embodiment 33 provides the curable composition of Embodiment 32, wherein the 9,9-bis(aminophenyl)fluorene compound is chosen from 9,9-bis(4-aminophenyl)fluorene, 4-methyl-9,9-bis(4-aminophenyl)fluorene, 4-chloro-9,9-bis(4-aminophenyl)fluorene, 2-ethyl-9,9-bis(4-aminophenyl)fluorene, 2-iodo-9,9-bis(4-aminophenyl)fluorene, 3-bromo-9,9-bis(4-aminophenyl)fluorene, 9-(4-methylaminophenyl)-9-(4-ethylaminophenyl)fluorene, 1-chloro-9,9-bis(4-aminophenyl)fluorene, 2-methyl-9,9-bis(4-aminophenyl)fluorene, 2,6-dimethyl-9,9-bis(4-aminophenyl)fluorene, 1,5-dimethyl-9,9-bis(4-aminophenyl)fluorene, 2-fluoro-9,9-bis(4-aminophenyl)fluorene, 1,2,3,4,5,6,7,8-octafluoro-9,9-bis(4-aminophenyl)fluorene, 2,7-dinitro-9,9-bis(4-aminophenyl)fluorene, 2-chloro-4-methyl-9,9-bis(4-aminophenyl)fluorene, 2,7-dichloro-9,9-bis(4-aminophenyl)fluorene, 2-acetyl-9,9-bis(4-aminophenyl)fluorene, 2-methyl-9,9-bis(4-methylaminophenyl)fluorene, 2-chloro-9,9-bis(4-ethylaminophenyl)fluorene, 2-t-butyl-9,9-bis(4-methylaminophenyl)fluorene, 9,9-bis(3-methyl-4-aminophenyl)fluorene, and 9-(3-methyl-4-aminophenyl)-9-(3-chloro-4-aminophenyl)fluorene, 9-bis(3-methyl-4-aminophenyl)fluorene, 9,9-bis(3-ethyl-4-aminophenyl)fluorene, 9,9-bis(3-phenyl-4-aminophenyl)fluorene, 9,9-bis(3,5-dimethyl-4-methylaminophenyl)fluorene, 9,9-bis(3,5-dimethyl-4-aminophenyl)fluorene, 9-(3,5-dimethyl-4-methylaminophenyl)-9-(3,5-dimethyl-4-aminophenyl)fluorene, 9-(3,5-diethyl-4-aminophenyl)-9-(3-methyl-4-aminophenyl)fluorene, 1,5-dimethyl-9,9-bis(3,5-dimethyl-4-methylaminophenyl)fluorene, 9,9-bis(3,5-diisopropyl-4-aminophenyl)fluorene, 9,9-bis(3-chloro-4-aminophenyl)fluorene, 9,9-bis(3,5-dichloro-4-aminophenyl)fluorene, 9,9-bis(3,5-diethyl-4-methylaminophenyl)fluorene, 9,9-bis(3,5-diethyl-4-aminophenyl)fluorene, and a mixture thereof.

Embodiment 34 provides the curable composition according to any one of Embodiments 1-33, further comprising core-shell rubber nanoparticles.

Embodiment 35 provides the curable composition according to Embodiment 34, wherein the core-shell rubber nanoparticles is in the range of from about 1 wt % to about 40 wt % of the curable composition.

Embodiment 36 provides the curable composition according to any one of Embodiments 34 or 35, wherein the core-shell rubber nanoparticles are about 2 wt % to about 20 wt % of the curable composition.

Embodiment 37 provides the curable composition according to any one of Embodiments 34-36, wherein the individual core-shell rubber nanoparticles have a volume average particle diameter of from 0.01 μm to 1 μm.

Embodiment 38 provides the curable composition according to any one of Embodiments 34-37, wherein the individual core-shell rubber nanoparticles have a volume average particle diameter of from 0.10 μm to 0.80 μm.

Embodiment 39 provides the curable composition according to any one of Embodiments 34-38, wherein the individual core-shell rubber nanoparticles have a glass transition temperature in the range of from about −70° C. to about 25° C. for a core layer.

Embodiment 40 provides the curable composition according to any one of Embodiments 34-39, wherein the individual core-shell rubber nanoparticles have a glass transition temperature in the range of from about 0° C. to about 120° C. for a shell layer.

Embodiment 41 provides the curable composition according to any one of Embodiments 34-40, wherein the curable composition comprises:

about 15 wt % to about 55 wt % of the liquid epoxy resin component;

about 10 wt % to about 53 wt % of the curative component;

about 15 wt % to about 25 wt % of the curable resin filler component;

about 15 wt % to about 25 wt % thermoplastic filler component; and about 2 wt % to about 30 wt % of the core-shell rubber nanoparticles.

Embodiment 42 provides the curable composition of Embodiment 41, wherein:

the liquid epoxy resin component is chosen from a diglycidyl ether of bisphenol F, a low epoxy equivalent weight diglycidyl ether of bisphenol A, a liquid epoxy novolac, a liquid aliphatic epoxy, a liquid cycloaliphatic epoxy, a 1,4-cyclohexandimethanoldiglycidylether, 3,4-epoxycyclohexylmethyl-3,4-epoxycyclohexane carboxylate, tetraglycidylmethylenedianiline, N,N,N', N'-Tetraglycidyl-4,4'-methylenebisbenzenamine and a mixture thereof.

the curative component is 9,9-bis(3-chloro-4-aminophenyl)fluorene;

the thermoplastic filler component is polyethersulfone; and the curable resin filler is N,N'-(4,4'-diphenylmethane)-bismaleimide.

Embodiment 43 provides a cured product of the curable composition according to any one of Embodiments 1-42.

Embodiment 44 provides the cured product of Embodiment 43, wherein the cured product has a thickness in the range of from about 2 mm units to about 15 mm.

Embodiment 45 provides the cured product according to any one of Embodiments 43 or 44, wherein the cured product has a thickness in the range of from about 5 mm to about 10 mm.

Embodiment 46 provides the cured product according to any one of Embodiments 43-45, wherein a Wet Glass Transition Temperature and a Dry Glass Transition Temperature of the cured product are substantially equal.

Embodiment 47 provides the cured product according to any one of Embodiments 43-46, wherein the Wet Glass Transition Temperature and the Dry Glass Transition Temperature of the cured product independently is in the range of from about 100° C. to about 300° C.

Embodiment 48 provides the cured product according to any one of Embodiments 43-47, wherein the Wet Glass Transition Temperature and the Dry Glass Transition Temperature of the cured product independently is in the range of from about 150° C. to about 275° C.

Embodiment 49 provides the cured product according to any one of Embodiments 43-48, wherein a peel strength of the cured product measuring 12.7 cm wide by 20.3 cm long by 0.1 cm thick located between a first aluminum substrate measuring 20.3 cm long by 7.6 cm wide by 0.16 cm thick and second aluminum substrate measuring 25.4 cm long by 7.6 cm wide by 0.064 cm thick and having the second aluminum substrate peeled at a rate of 30.5 cm/minute is in the range of from about 20 N/25 mm to about 300 N/25 mm.

Embodiment 50 provides the cured product according to any one of Embodiments 43-49, wherein a peel strength of the cured product measuring 12.7 cm wide by 20.3 cm long by 0.1 cm thick located between a first aluminum substrate measuring 20.3 cm long by 7.6 cm wide by 0.16 cm thick and second aluminum substrate measuring 25.4 cm long by 7.6 cm wide by 0.064 cm thick and having the second aluminum substrate peeled at a rate of 30.5 cm/minute is in the range of from about 100 N/25 mm to about 180 N/25 mm.

Embodiment 51 provides a method of making the curable composition according to any one of Embodiments 1-50, the method comprising:

adding the curative component to a first solution comprising the liquid epoxy resin component and the curable resin filler component to form a second solution; and forming the curable composition.

Embodiment 52 provides the method of Embodiment 51, further comprising mixing the first solution.

Embodiment 53 provides the method according to any one of Embodiments 51 or 52, further comprising mixing the second solution.

Embodiment 54 provides the method according to any one of Embodiments 51-53, wherein the first solution further comprises one or more core-shell rubber nanoparticles.

Embodiment 55 provides the method according to any one of Embodiments 51-54, further comprising heating the first solution to a temperature in the range of from about 25° C. to about 150° C.

Embodiment 56 provides the method according to any one of Embodiments 51-55, further comprising adding a thermoplastic resin to the second solution.

Embodiment 57 provides the method according to any one of Embodiments 53-56, further comprising mixing the second solution after adding the thermoplastic resin.

Embodiment 58 provides the method according to any one of Embodiments 56 or 57, wherein the thermoplastic resin polymer component is added to the second solution about 1 second to about 5 minutes after mixing the second solution.

Embodiment 59 provides a cured product formed according to the method of any one of Embodiments 51-58.

Embodiment 60 provides the cured product of Embodiment 59, wherein the cured product is more heat resistant than a corresponding cured product formed from a curable composition that is free of the curable resin filler component.

Embodiment 61 provides the cured product of Embodiment 60, wherein the curable resin filler component is bismaleimide compound.

Embodiment 62 provides the cured product of any one of Embodiments 60 or 61 wherein the curable resin filler component is 4,4'-bismaleimido-diphenylmethane.

Embodiment 63 provides a method of curing the curable composition of any one of Embodiments 1-42 or formed according to any one of Embodiments 51-58, wherein curing the curable composition comprises increasing the temperature of the environment to a curing temperature.

Embodiment 64 provides the method of Embodiment 63, wherein the pressure is changed by about 100 kPa to about 400 kPa.

Embodiment 65 provides the method according to any one of Embodiments 63 or 64, wherein the pressure is changed by about 250 kPa to about 300 kPa.

Embodiment 66 provides the method according to any one of Embodiments 63-65, wherein the curing pressure is in the range of from about 100 kPa to about 110 kPa.

Embodiment 67 provides the method according to any one of Embodiments 63-66, wherein the temperature is increased by about 100° C. to about 400° C.

Embodiment 68 provides the method according to any one of Embodiments 63-67, wherein the temperature is increased by about 150° C. to about 300° C.

Embodiment 69 provides the method according to any one of Embodiments 63-68, wherein the curing temperature is in the range of from about 150° C. to about 400° C.

Embodiment 70 provides the method according to any one of Embodiments 63-69, wherein the temperature is increased at a rate of about 1° C./min to about 10° C./min.

Embodiment 71 provides the method according to any one of Embodiments 63-70, wherein the temperature is increased at a rate of about 1° C./min to about 3° C./min.

Embodiment 72 provides the method according to any one of Embodiments 63-71, wherein the final curing temperature and the final curing pressure are maintained for about 30 minutes to about 600 minutes.

Embodiment 73 provides the method according to any one of Embodiments 63-72, wherein the final curing temperature and the final curing pressure are maintained for about 60 minutes to about 200 minutes.

Embodiment 74 provides the method according to any one of Embodiments 63-73, wherein the curing is performed in an autoclave.

Embodiment 75 provides a method of using the curable composition according to any one of Embodiments 1-42 or made according the method of any one of Embodiment 51-58, the method of using the curable composition comprising:

contacting the curable composition with a first substrate; and curing the curable composition.

Embodiment 76 provides the method according to Embodiment 75, further comprising contacting the curable composition with a second substrate.

Embodiment 77 provides the method according to any one of Embodiments 75 or 76, wherein at least one of the first and second substrate comprises a metal, a plastic, a ceramic, or a mixture thereof.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising:
   a liquid epoxy resin component;
   a curative component; and
   a curable resin filler component, at least a portion of which is dispersed in the liquid epoxy resin and having a melting point in the range of from 50° C. to 250° C., wherein both the curable resin filler and curative component remain solid within the curable composition at 25° C. such that a film comprising the curable composition is tacky and is capable of being cut and applied to a substrate.

2. The curable composition according to claim 1, wherein the liquid epoxy resin component comprises one or more epoxy resins chosen from a diglycidyl ether of bisphenol F, a low epoxy equivalent weight diglycidyl ether of bisphenol A, a liquid epoxy novolac, a liquid aliphatic epoxy, a liquid cycloaliphatic epoxy, a 1,4-cyclohexandimethanoldiglycidylether, 3,4-epoxycyclohexylmethyl-3,4-epoxycyclohexane carboxylate, tetraglycidylmethylenedianiline, N,N,N',N'-tetraglycidyl-4,4' methylenebisbenzenamine, a triglycidyl of para-aminophenol, N,N,N',N'-tetraglycidyl-m-xylenediamine, and a mixture thereof.

3. The curable composition according to claim 1, wherein the curable resin filler component is in the range of from about 2 wt % to about 70 wt % of the curable composition.

4. The curable composition according to claim 1, wherein the curable resin filler component comprises one or more resins chosen from a solid epoxy resin, a bismaleimide resin, a polyimide resin, a cyanate ester resin, a benzoxazine resin, and a mixture thereof.

5. The curable composition according to claim 1, further comprising a thermoplastic polymer filler component.

6. The curable composition of claim 5, wherein the thermoplastic polymer filler component is in the range of from about 5 wt % to about 80 wt % of the curable composition.

7. The curable composition according to claim 5, wherein the thermoplastic polymer filler component comprises one or more thermoplastic polymers chosen from an acrylate, an alkyl(meth) acrylate, a polyamide-imide, a polyetherimide, a polysulfone, a polyamide, a polyvinylchloride, an acrylonitrile butadiene styrene, a polystyrene, a polyether ether ketone, a polyetherketoneketone, a polytetrafluoroethylene, a polyphenylene sulphide, a polyethylene terephthalate, a polyoxymethylene, a polypropylene, a high density polyethylene, a low density polyethylene, a polypropylene, a siloxane, a polyoxymethylene, a polycarbonate, a polyarylsulfone, a polyethersulfone, a polyphenlysulfone, and a mixture thereof.

8. The curable composition according to claim 7, wherein a weight average molecular weight of at least one of the thermoplastic polymers is in the range of from about 5,000 daltons to about 100,000 daltons.

9. The curable composition of claim 5, wherein about 50 wt % to about 100 wt % of the one or more thermoplastic polymers are solid in the curable composition at a temperature of 25° C.

10. The curable composition according to claim 1, wherein the curative component comprises one or more curative compounds chosen from an aliphatic polyamine compound, an aromatic polyamine compound, an aromatic polyamide compound, an alicyclic polyamine compound, a polyamine compound, a polyamide compound, an amino resin compound, a 9,9-bis(aminophenyl)fluorene compound, and a mixture thereof.

11. The curable composition according to claim 1, further comprising core-shell rubber nanoparticles.

12. The curable composition according to claim 11, wherein the curable composition comprises:
   about 15 wt % to about 55 wt % of the liquid epoxy resin component;
   about 10 wt % to about 53 wt % of the curative component;
   about 15 wt % to about 25 wt % of the curable resin filler component;
   about 15 wt % to about 25 wt % thermoplastic filler component; and
   about 2 wt % to about 30 wt % of the core-shell rubber nanoparticles.

13. A method of making the curable composition according to claim 1, the method comprising:
   adding the curative component to a first solution comprising the liquid epoxy resin component and the curable resin filler component to form a second solution; and
   forming the curable composition.

14. The method of claim 13, further comprising mixing the first solution.

15. The method according to claim 13, further comprising mixing the second solution.

16. The method according to claim 13, further comprising adding the thermoplastic resin to the second solution.

17. A cured product of the curable composition according to claim 1.

18. The cured product according to claim 17, wherein a Wet Glass Transition Temperature and a Dry Glass Transition Temperature of the cured product are substantially equal.

19. The cured product according to claim 18, wherein the Wet Glass Transition Temperature and the Dry Glass Transition Temperature of the cured product independently is in the range of from about 100° C. to about 300° C.

20. The curable composition according to claim 1, wherein the tacky film product has a thickness range of 0.1 mm to 1.20 mm.

21. The curable composition according to claim 20, wherein the tacky film product has a thickness range from 2 mm to 15 mm.

* * * * *

UNITED STATES PATENT AND TRADEMARK OFFICE
CERTIFICATE OF CORRECTION

PATENT NO. : 11,078,358 B2
APPLICATION NO. : 16/494976
DATED : August 3, 2021
INVENTOR(S) : Lianzhou Chen Page 1 of 1

It is certified that error appears in the above-identified patent and that said Letters Patent is hereby corrected as shown below:

In the Claims

Column 30
Line 24, Claim 12, insert --of the-- before "thermoplastic filler".

Signed and Sealed this
Thirtieth Day of August, 2022

Katherine Kelly Vidal
*Director of the United States Patent and Trademark Office*